May 29, 1945. J. J. TOMALIS 2,377,114
STAKE BOLT
Filed July 6, 1943
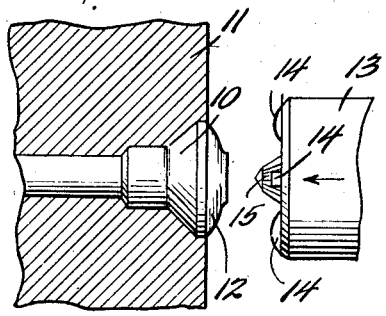
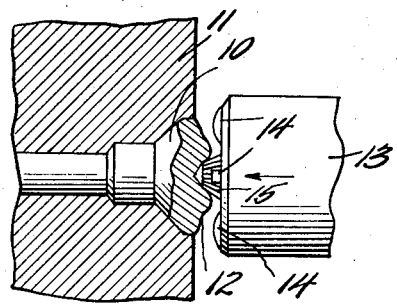
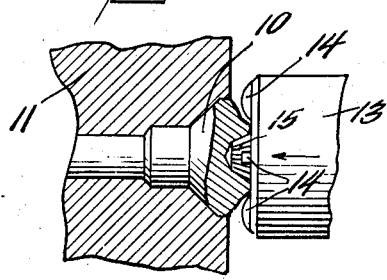
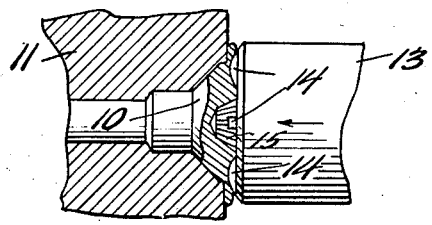
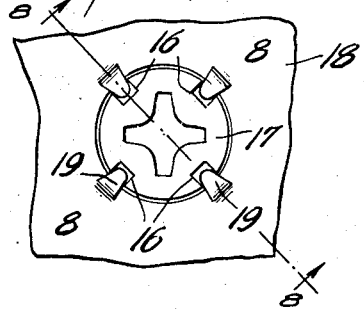
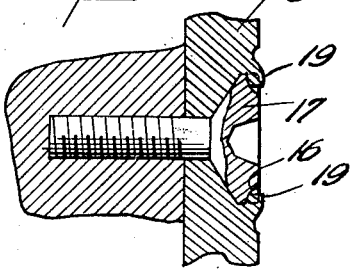
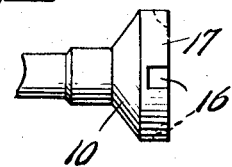
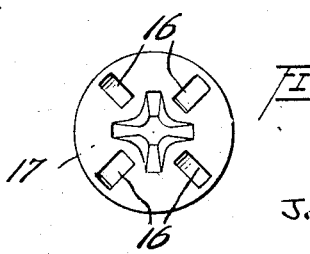
Inventor
J. J. Tomalis
By Watson, Cole, Grindle & Watson
Attorneys Patented May 29, 1945

2,377,114

UNITED STATES PATENT OFFICE 2,377,114

STAKE BOLT

Joseph J. Tomalis, Providence, R. I.; Lillian D. Tomalis, administratrix of Joseph J. Tomalis, deceased, assignor to American Screw Company, Providence, R. I., a corporation of Rhode Island Application July 6, 1943, Serial No. 493,649

4 Claims. (Cl. 10—10)

The present invention relates to bolts, screws, and the like, and more particularly to a method and tool for manufacturing headed bolts and screws of the type commonly referred to as "stake bolts," the heads of which are provided with peripheral recesses, for certain uses.

In the case of many present day applications, such as in the aircraft field, in which it is essential for bolts and screws to remain tightly seated under extremely severe vibrations, it is necessary to lock them positively in place by peening or forcing a small portion of the relatively soft material of the assembly itself into corresponding grooves or recesses in the periphery of the bolt or screw head, after the latter is tightened in place. In the past, it has been customary to form the said recesses in the heads of the bolts and screws by machining, thereby adding considerably to the cost of manufacture. An alternative method is to stamp the recesses into the heads by an operation subsequent to the heading of the bolts or screws. However, this practice is little used because of the excessive tool breakage due to the excessive force necessary to cause a flow of material to form the recesses by means of a blow normal to the surface of the material.

It is the principal object of the present invention to provide a method of forming recesses or staking slots in the heads of bolts, screws, and the like during the operation in which the head is formed, thus eliminating an extra operation and considerably reducing the cost of the product, as well as reducing tool breakage.

It is a further object of the invention to provide a tool especially adapted to carry out the aforesaid method.

More particularly it is an object of the present invention to provide a method of forming stake bolts (which term will be employed hereinafter to designate bolts, screws, and the like provided with staking slots or recesses), by causing the material of a partially formed bolt head to flow radially outward from the center of the partially formed head, said material flowing past a plurality of angularly spaced projections provided on the striking tool. Thus, the staking slots or peripheral recesses are formed by flowing the material of the bolt head past the obstructions, rather than by forcing the obstructions into a finished head, with the result that the stresses exerted upon the said obstructions or projections are very much less than would otherwise be the case, and the tool breakage is correspondingly reduced.

Other and further objects, features, and advantages of the present invention will be apparent to one skilled in the art from the following description taken in connection with the accompanying drawing in which:

Figure 1 is an axial section through a die containing a work blank, the head of which has been partially formed by a previous operation, and showing the working end of the tool by means of which the formation of the staking slots is subsequently carried out;

Figure 2 is a view similar to Figure 1 showing the operation of forming the staking slots in an initial stage;

Figure 3 is a view similar to Figure 2, but showing the tool in a more advanced position;

Figure 4 is a view similar to Figures 2 and 3, but showing the tool in its most advanced position;

Figure 5 is a view looking down on the head of the work blank after the completion of the operation illustrated in Figures 1 to 4;

Figure 6 is a side elevation of the work blank of Figure 5 after the succeeding peripheral trimming operation has taken place;

Figure 7 is a view looking down on the head of a finished bolt which has been inserted and "staked" in place; and Figure 8 is a section on line 8—8 of Figure 7.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would occur to one skilled in the art to which the invention relates.

The method of the present invention is adapted to be carried out by the use of the conventional machine known as the "cold header." Usually, bolt and screw blanks are formed on a "two-stroke" cold header, the first stroke putting the work blank in the condition illustrated in Figure 1, in which the top of the partially formed head is bulging, i. e. substantially rounded. The formation of the head of the unfinished blank is completed by the second stroke of the cold header.

While the present invention is not limited to screws and bolts of the cruciform recess or "Phillips" type, the punch used in forming the "Phillips" recess is particularly well adapted to the present method, and is employed for illustrative purposes in the present drawing and description.

Referring to Figure 1 a work blank 10 seated in a die 11 has been subjected to the first stroke of a two-stroke cold header whereby the head 12 of the blank has been partially formed, the outer or upper surface of the head having a bulging or substantially rounded shape. The tool 13 is approaching the blank to perform the second stroke of the cold heading process.

Tool 13 differs from the conventional punch used in forming the "Phillips" recess by virtue of the angularly spaced, radially extending projections 14 of which there are preferably four spaced at 90° intervals. These projections are of materially less height than the central projection 15 which forms the driving recess and are preferably the shape illustrated, having parallel sides extending substantially radially of the tool and a rounded outer or working surface. However, the form of the projections 14 may be varied without departing from the spirit of the invention, but preferably they are so shaped as to provide a minimum of resistance to the flow of metal past and beneath them as the central projection 15 penetrates the material of the work blank.

Figure 2 shows the tool 13 in a more advanced position, in which the central projection 15 has partly penetrated the material of the work blank, initiating the radially outward flow of such material, and the formation of the "Phillips" type driving recess.

Figure 3 shows the tool 13 in a still further advanced position in which the central projection 15 has penetrated to its full depth into the material of the work blank, whereby the remaining travel of the tool to the position illustrated in Figure 4 causes a squeezing or extrusion of the material radially outwards, past the sides and outer or working surface of the projections 14. The condition of the work blank at the completion of the movement of the tool 13 is shown in Figure 4 and a plan or end view of the work blank after removal from the die is seen in Figure 5.

It will be seen that the operations just described result in the formation of a blank having a central driving recess of the "Phillips" type and four radially extending parti-discoidal recesses extending to or nearly to the periphery of the head of the blank. Of course, in order to be useful for the purposes intended, the peripheral recesses must extend to and constitute openings in the lateral face of the bolt head, and the work blank is therefore subjected to a trimming operation by which the outer edge of the head is trimmed off down to a line intersecting the recesses 16, preferably at the point of their greater depth. The condition of the blank after this trimming operation is illustrated in Figure 6. The blank is then heated treated in the usual manner, and finished by grinding and threading.

Figures 7 and 8 illustrate the method of use of bolts and screws produced in accordance with the invention. In Figure 7 the bolt head is designated by the reference character 17 and the material of the assembly in which it is used is designated as 18. After the bolt has been threaded tightly into place, small portions or prongs 19 of the material 18 are forced into the staking slots or recesses 16 by means of any suitable sharp tool, thereby locking the bolt against rotation and hence against displacement.

Having thus described the invention, what is claimed as new and desired to be secured by Letters Patent is:

1. In a method of manufacturing bolts and screws by cold heading a work blank, the steps of punching said work to form a head having a central cruciform recess, thereby causing the metal of the work blank to flow radially past a plurality of obstructions, thus forming a plurality of spaced recesses adjacent the periphery of the head, and trimming off the outer portion of the head to a line intersecting said spaced recesses, whereby the remaining portions of said recesses extend to and constitute openings in the lateral surface of said head.

2. In a method of manufacturing bolts and screws by cold heading a work blank, the steps of punching said work to form a head having a central cruciform recess, thereby causing the metal of the work blank to flow radially past a plurality of parti-discoidal obstructions, thus forming a plurality of spaced recesses adjacent the periphery of the head, and trimming off the outer portion of the head to a line intersecting said spaced recesses, whereby the remaining portions of said recesses extend to and constitute openings in the lateral surface of said head.

3. In a method of manufacturing bolts and screws the steps of upsetting one end of a work blank to form a substantially rounded head thereon, subjecting said head to a further upsetting operation whereby a central recess is formed therein and the displaced metal is caused to flow radially past a plurality of obstructions, thus forming a plurality of spaced recesses adjacent the periphery of the head, and trimming off the outer portion of the head to a line intersecting said spaced recesses, whereby the remaining portions of said recesses extend to and constitute openings in the lateral surface of said head.

4. In a method of manufacturing bolts and screws, the steps of upsetting one end of a work blank to form a substantially rounded head thereon, subjecting said head to a further upsetting operation whereby a central recess is formed therein and the displaced metal is caused to flow radially past a plurality of parti-discoidal obstructions, thus forming a plurality of spaced recesses adjacent the periphery of the head, and trimming off the outer portion of the head to a line intersecting said spaced recesses, whereby the remaining portions of said recesses extend to and constitute openings in the lateral surface of said head.

JOSEPH J. TOMALIS.